UNITED STATES PATENT OFFICE.

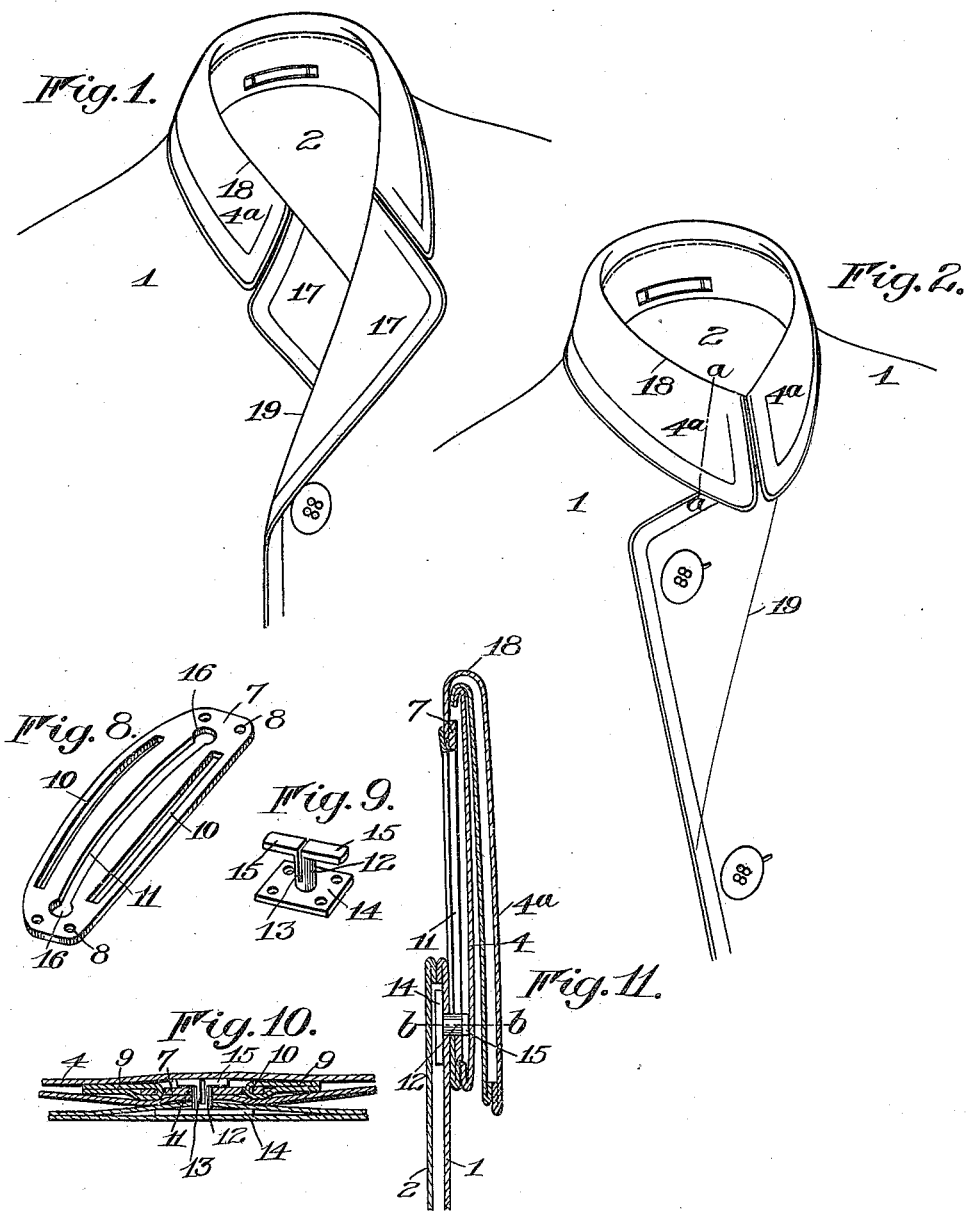

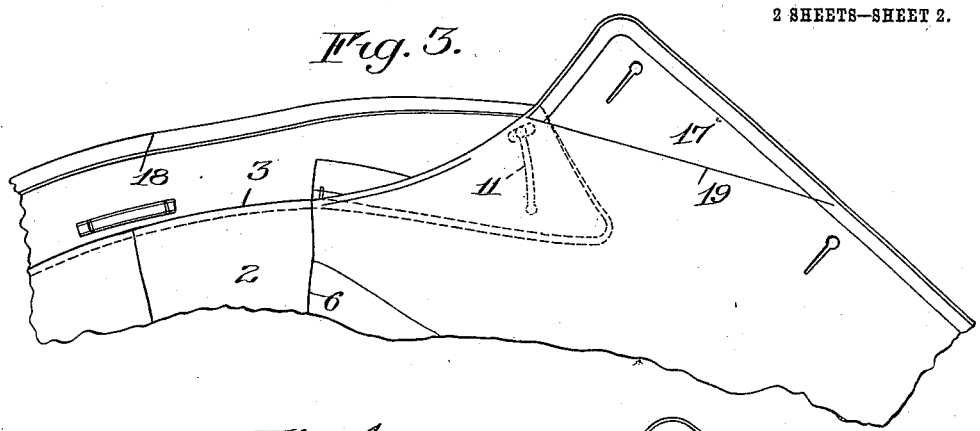
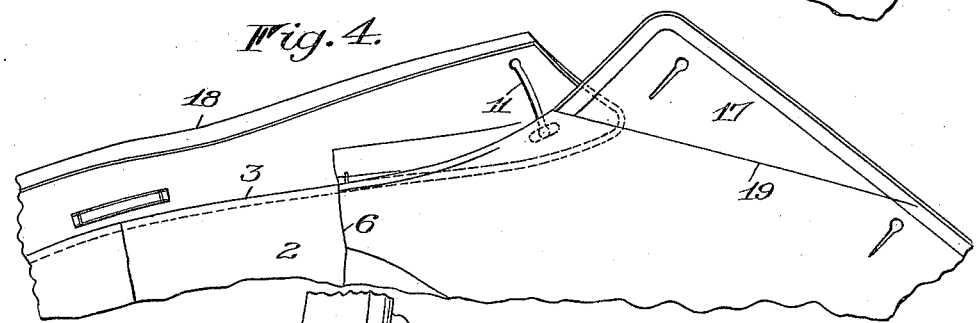
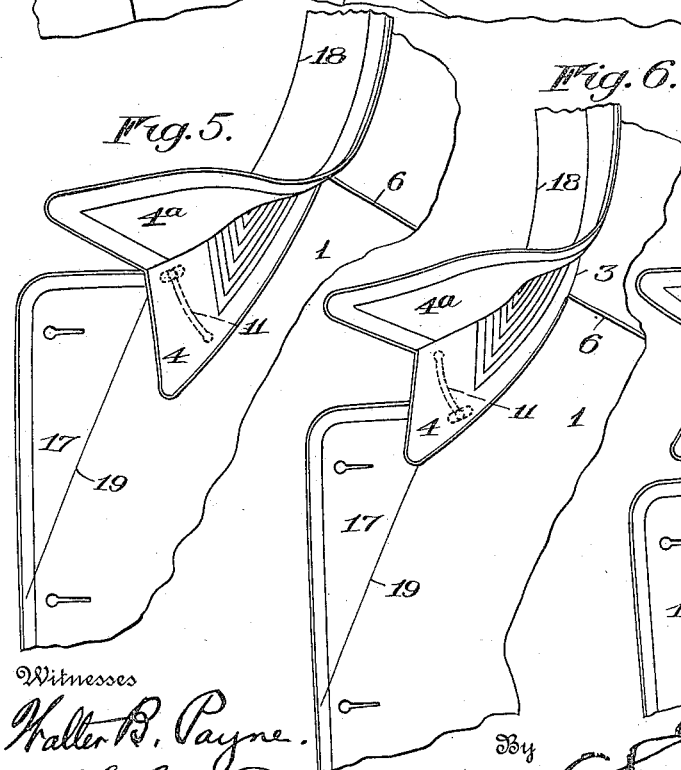

WILLIAM T. CONNOR AND CLEMENS HESS, OF ROCHESTER, NEW YORK, ASSIGNORS TO STEEFEL, STRAUSS & CONNOR, OF ROCHESTER, NEW YORK, A FIRM.

GARMENT.

963,279.  Specification of Letters Patent.  Patented July 5, 1910.

Application filed December 4, 1909.  Serial No. 531,401.

*To all whom it may concern:*

Be it known that we, WILLIAM T. CONNOR and CLEMENS HESS, of Rochester, in the county of Monroe and State of New York, have invented certain new and useful Improvements in Garments; and we do hereby declare the following to be a full, clear, and exact description of the same, reference being had to the accompanying drawings, forming a part of this specification, and to the reference-numerals marked thereon.

The present invention relates to garments and more particularly that type having convertible collars which may be either employed in combination with lapels or adjusted to produce a military or "Prussian" effect; and it has for an object the provision of a collar that may move bodily at its forward ends relatively to the body portion of the garment and may be held in any position between its limits of adjustment so that the garment may be adapted to the necks of different persons.

Another object of the invention is to provide an adjustment which may be effected in an easy and expeditious manner.

To these and other ends the invention consists in certain improvements and combinations of parts, all as will be hereinafter more fully described, the novel features being pointed out in the claims at the end of the specification.

In the drawings: Figure 1 is a perspective view of the upper portion of an improved garment, such as an overcoat, with the collar thereof in its lowermost position and the lapels turned down; Fig. 2 is a like view showing the lapels turned up and the collar adjusted to its uppermost position; Fig. 3 is a detail view of the inner portion of the coat in proximity to one end of the collar, the latter being shown in its lowermost position; Fig. 4 is a view similar to Fig. 3 with the collar in its uppermost position; Fig. 5 is a detail view of the outer portion of the coat in proximity to one end of the collar, the latter being arranged in its lowermost position and having its outer fold turned upwardly; Fig. 6 is a view similar to Fig. 5 with the collar in its uppermost position; Fig. 7 is a view of the collar detached at one end from the body portion of the collar; Figs. 8 and 9 are detail views of the devices which control the movement of the collar; Fig. 10 is a section on the line *a—a* of Fig. 2, and Fig. 11 is a section through the collar and a portion of the garment.

In this invention, the collar is so connected at its forward ends with the body portion of the garment that it may be moved without any rolling from a lowermost position in which the turn or fold coincides with the turn or fold of the lapels, to an uppermost position in which it gives a military or "Prussian" effect and is especially adapted for protection against stormy or very cold weather.

In the embodiment of the invention herein illustrated the garment comprises a body portion formed of an outer cloth 1 and an inner cloth 2 to which is connected the collar preferably folded or turned at 18 to provide an outer fold 4$^a$ and an inner fold 4, the latter being preferably rigidly secured at its rear portion, as at 3, to the neck of the body portion so as to maintain substantially a fixed relation to said body portion and having its forward lower portions separated from the body portion of the garment as by cuts 5 which extend in this instance from the lapels 17 to the shoulder seam 6. Of course, this separation between the lower edge of the inner fold may be obtained by other means than cuts, it being only necessary to provide a construction which will permit the raising and the lowering of the forward ends of the collars without changing the general shape thereof.

To the end that the collar ends may be held in any positions between their two limits of adjustment, there may be provided on one of the parts of the garment, in this instance, on the collar, guides preferably in the form of slotted plates 7, each of which may be secured between the two layers forming the inner fold of the collar 4 by threads passing through eyes 8 in the plate 7 and through tapes 9 which are lapped through the slots 10 in the plate and held between the layers of the fold 4. The inner cloth of the inner fold 4 is cut to expose each guide slot 11 so that devices on the outer side of the body portion of the garment may coöperate with the guides. These devices in this instance are each in the form of a stud 12 slit at 13 to give resiliency to its arms which bear with friction the opposite side walls of the slot 11 to hold the collar in its adjusted positions. Each device has means, such as a perforated plate 14, adapting it for attachment to the garment, and a head formed by oppositely extending arms 15 on the stud to prevent accidental withdrawal of the stud from its slotted guide plate. The stud, however, may be separated from the guide plate by effecting a relatively rotary movement between the stud and the plate so that the arms or head 15 may pass through the slot 11. In order that the collar ends may be held more securely in their two extreme positions, each slotted plate 7 may be provided with locking notches 16 at the extreme ends of the slots 11. The slots are preferably curved about the inner ends of the collar ends as centers so that bulging of the collar on the body portion will be prevented.

To adjust the garment from the position shown in Fig. 1 to that shown in Fig. 2 it is merely necessary to pull on the ends of the collar in directions to draw the latter upwardly causing the resilient members or studs 12 to travel in engagement with the walls of the guide slots 11 until the upper position of the collar has been reached. The lowering of the collar is effected by pulling on the inner fold 4 until the fold or turn 18 of the collar alines with the folds or turns 19 of the lapels. Of course, the lapels are folded after each shifting of the collar.

This invention makes it possible to change the garment almost instantly from one form to another without the manipulation of fastening devices which hold the collar at the limits of its adjustment. The collar may be adjusted to suit the neck of the wearer, and the guide being arranged on the inner face of the inner fold and coöperating with a device on the exterior of the body portion, is not liable to be exposed when the collar is in either position.

We claim as our invention:

1. A garment comprising a body portion, a folded collar having the forward lower portions of its inner fold movable relatively to the body portion to permit the fold of the collar to be raised or to be lowered, and means for securing the collar at any point between its two limits of adjustment.

2. A garment comprising a body portion, a collar secured at its rear to the neck of the body portion and having its forward portions separated from the body portion by cuts to permit the collar ends to be raised and lowered, and connections between the forward portions of the collar and the body for securing the said collar portions in any positions between their two limits of adjustment.

3. A garment comprising a body portion, a folded collar having the forward lower portions of its inner fold separated from the body portion to permit the fold to be raised or to be lowered, and a connection between such inner fold and the body portion for securing the collar in any position to which it may be adjusted.

4. A garment comprising a body portion, a collar having its forward portions movable relatively to the body portion to permit the collar to be raised and to be lowered, a guide on one of said parts, and a device on the other part coöperating with the guide during the movement of the collar relatively to the body portion of the garment.

5. A garment comprising a body portion, a folded collar having the forward lower portions of its inner fold movable relatively to the body portion to permit the fold of the collar to be raised or to be lowered, a guide on the inner side of the inner fold, and a device on the outer side of the body portion coöperating with the guide during the movement of the collar relative to the body portion.

6. A garment comprising a body portion, a collar having its forward portions movable relatively to the body portion to raise or to lower the collar, and means for securing the collar in any position to which it may be adjusted relatively to the body portion comprising a guide on one of said parts and a device on the other of said parts, one of said securing parts being resilient to produce friction between them.

7. A garment comprising a body portion, a collar having its forward portions movable relatively to the body portion to raise or to lower the collar, a slotted guide plate secured to one of said parts for directing the movement of the collar relatively to the body portion, and a headed member arranged on the other of said parts and operating in the slot of the guide plate.

8. A garment comprising a body portion, a folded collar having the forward lower portions of its inner fold movable relatively to the body portion to raise or to lower the collar fold, a slotted guide plate arranged on the inner side of the inner fold of the collar, and a headed device carried by the outer side of the body garment and coöperating with the slotted plate.

9. A garment comprising a body portion, a collar having its forward portions movable relatively to the body portion to raise or to lower the collar, a guide on one of said parts, and a resilient device on the other of said parts coöperating with the guide for holding the collar in different positions.

10. A garment comprising a body portion, a collar having its forward portions movable relatively to the body portion, a slotted guide secured to one of said parts, and a headed resilient device carried by the other of said parts and operating in the slotted guide.

11. A garment comprising a body portion, a folded collar having the forward lower portions of its inner fold movable relatively to the body portion, a slotted guide plate secured to the inner side of the inner fold, and a headed resilient device arranged on the outer side of the body portion and operating in the slotted plate.

12. A garment comprising a body portion, a collar having its forward portions movable relatively to the body portion, a curved guide carried by one of said parts, and a device on the other part coöperating with the guide.

WILLIAM T. CONNOR.
CLEMENS HESS.

Witnesses:
G. WILLARD RICH,
ERWIN S. PLUMB.